Inventors
Ichiro Arimura
Tadashi Nagaoka
By Stevens, Davis, Miller & Mosher
ATTORNEYS Inventors
Ichiro Arimura
Tadashi Nagaoka
By Stevens, Davis, Miller & Mosher
ATTORNEYS

United States Patent Office 3,330,907
Patented July 11, 1967

3,330,907

MODULATION INDICATING DEVICES

Ichiro Arimura, Kyoto, and Tadashi Nagaoka, Nishinomiya, Japan, assignors to Matsushita Electric Industrial Co., Ltd., Osaka, Japan, a corporation of Japan Filed Oct. 7, 1963, Ser. No. 314,431
Claims priority, application Japan, Oct. 8, 1962, 37/44,576; Sept. 5, 1963, 38/48,276
3 Claims. (Cl. 178—6)

The present invention relates to a modulation indicating device adapted for indicating an amount of modulation in a modulator, and more particularly to a device for detecting a peak level of a modulating signal to indicate that a modulated signal exceeds a predetermined frequency band.

In case of frequency modulation, which is one modulating method, deviation of angular frequencies is inversely proportional to a modulation index to thereby suppress a side band when such modulation index is fixed, and the side band generally remains the same even with variation in a modulating frequency. Therefore, the modulation index can be known from a peak value of a modulator input signal, and heretofore there has generally been adopted a monitoring method by means of a modulation index monitoring device comprising a Braun tube oscillograph.

However, modern apparatus utilizing a modulation system have made a remarkable advance and development, and problems have arisen in the monitoring and measurement by conventional measuring instruments such as a Braun tube oscillograph. In other words, the simplified structure of various apparatus utilizing a modulation system more and more requires a simple method of measuring and monitoring such an item as a modulation index which is necessary for proper operation of such apparatus. Image transcription apparatus for television, for example, can be cited among the apparatus on which the presence of such problems can most clearly be pointed out.

One of presently best known image transcription apparatus for television utilizes a method which comprises recording an electrical video signal directly on a magnetic tape and reproducing said electrical signal at a suitable time to supply said signal on a television screen for visualizing the image on said screen. In conventional methods of magnetic recording, a signal such as a television signal of an extremely high frequency or having a frequency band of an extremely wide range is directly recorded on a magnetic tape. In order to reproduce high frequency components of the signal recorded according to such method, a very great relative velocity must be provided between a recording or reproducing head and a magnetic medium moving past a gap in such head. On the other hand, the magnetic medium such as a magnetic tape is required to travel at an ordinary low velocity. For satisfying both of these two contradictory requirements, a method is generally used in which the magnetic head is mechanically rotated at a high speed in the transverse direction of the magnetic tape to thereby attain the required relative velocity between the tape and the recording head. The magnetic tape is made to move past the head in the longitudinal direction of the tape at a rate of 15 inches per second, and the signal is recorded on the tape in the form of a series of transverse lines or tracks. As a matter of fact, the relative velocity between the tape and the recording head is made extremely high to an extent of about 20 to 40 meters per second. Such high velocity however is not sufficient to satisfy the purpose of recording and reproducing a television signal having such a high frequency component as 4 megacycles.

As a result of such manner of operation, there is a need of restricting the frequency band during image transcription. In this modulation system, therefore, the value of the modulaiton index in the frequency modulation is made extremely low to an extent of less than one, because, if the modulation index in a FM modulator is very great and a major portion of FM components are scattered outside of said restricted band, only a portion of the input signal recorded during the image transcription may be reproduced during the reproducing operation. Since this will apparently result in a remarkable loss of the reproduced signal, the width of the band must be detected during the image transcription and the degree of modulation must be suitably determined so as to accommodate the necessary FM components within a band in which the image transcription is practicable.

In the case of the frequency modulation, the modulation index can be sufficiently monitored by watching the peak value of the modulator input signal, as described in the foregoing, and the Braun tube oscillograph is utilized to monitor the modulation index. Therefore, there are image transcription apparatus in which such oscillograph is incorporated, but the present trend in said image transcription apparatus is directed to those of a portable type having a simple structure in addition to a light weight and a small size. In such small sized image transcription apparatus, the monitoring of the modulation index by said oscillograph will merely result in complicated structure of the image transcription apparatus, which is undesirable because of increased weight and high cost.

With the above drawbacks of prior technique in view, it is the primary object of the present invention to provide an improved modulation indicating device.

Another object of the invention is to provide a device of said nature, comprising means for detecting any excess of a modulated signal over a predetermined frequency band on the basis of a peak level of a modulating signal for thereby generating an electric signal, and indicating means operative in response to said electric signal.

Still another object of the invention is to provide a device of said nature, comprising means for detecting any excess of a modulated signal over a limited frequency on the basis of a peak level of a modulating signal for thereby generating an electric signal, and indicating means operative in response to said electric signal.

Further another object of the invention is to provide a device of said nature, comprising said electric signal in the form of a pulse signal, and indicating means operative in response to said pulse signal.

Yet another object of the invention is to provide a device of said nature, comprising means for driving an indicator driving circuit in response to the generation of said pulse signal.

Another object of the invention is to provide a device of said nature, comprising said modulating signal in the form of a television signal, means for overlapping said pulse signal on a demodulated television signal, and means for indicating said overlapped signal on the receiving tube of a television set.

Still another object of the invention is to provide a modulation indicating device of said nature which is applicable to a magnetic recording and reproducing system.

There are other objects and particularities of the invention which will become obvious from the following description with reference to the accompanying drawings, in which.

Hereinunder, explanation will be given with regard to a modulation indicating device of the invention, shown in FIG. 1 and succeeding drawings, which is adapted to indicate, as mentioned above, any excess of a modulated signal over a predetermined frequency band on the basis of a peak level of a modulating signal.

Figure 1:
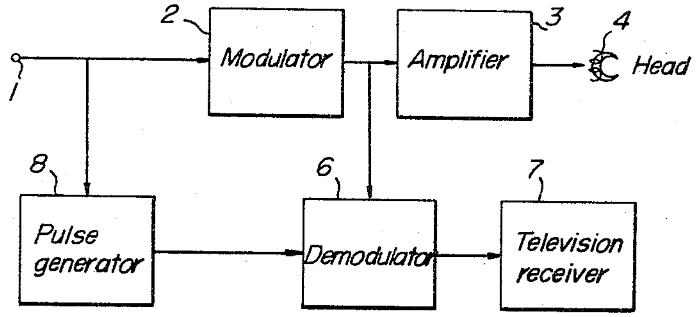
FIG. 1 is a block diagram showing an embodiment of a modulation indicating device according to the invention.

FIG. 1 shows an embodiment of the modulation indicating device of the invention which is applied to a magnetic image transcription system. A video signal fed into the system through an input terminal 1 is subject to frequency modulation by a modulator 2 and amplified by an amplifier 3, thence supplied to a magnetic head 4 for image transcription for being recorded on a tape. Meanwhile, a portion of the modulated video signal is fed to a demodulator 6, which demodulates the modulated video signal to supply the demodulated video signal to a television receiver 7. Namely, by applying an electric detection signal, such as a detection pulse, to the base of a transistor of the output stage, forming an emitter follower circuit, the detection signal (pulse) is superposed on the demodulated video signal. For this purpose there is interposed between the video input terminal 1 and the demodulator 6 a device such as a pulse generator 8 for detecting a peak level of the video signal and generating the detection signal. The demodulated video signal, including the detection signal, is fed to the television receiver 7 through a suitable cable. Then, the video signal from the demodulator 6 is visibly displayed at the receiver 7 for monitoring.

The modulation indicating device of FIG. 1 operates in the following manner. Supposing that a modulating signal takes the form of a composite video signal having a wave form as shown at *a* of FIG. 2. If a peak level of the video signal in the vicinity of points $t_1$ and $t_2$ is higher than a maximum allowable input peak level $V_1$ of the modulator, it is apparent that a portion of a reproduced signal after recording and reproducing will be lost. Therefore, the peak level of the modulating signal must be lower than the maximum allowable input peak level $V_1$ of the modulator.

Figure 2:
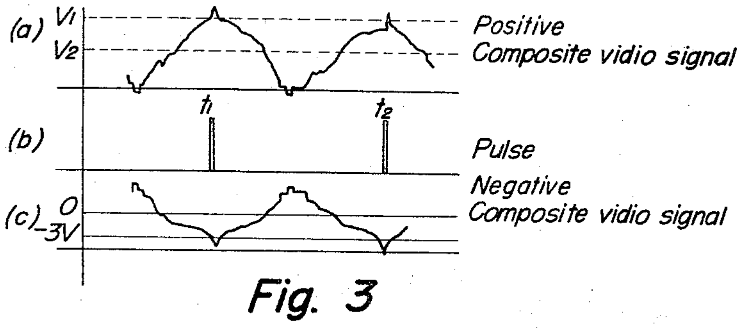
FIG. 2 is a view showing wave forms of signals at various parts of the device of FIG. 1.

To this end, the pulse generator is connected to any one of the modulator 2, demodulator 6 and monitoring receiver 7 to provide a pulse-like signal having a suitable polarity as shown at *b* of FIG. 2. (In FIG. 1, the pulse generator 8 is shown as connected to the demodulator 6.) When such pulse signal is superimposed on the video signal which has a higher peak level than the maximum allowable input peak level $V_1$, an unusual image will appear in a monitoring image during the image transcription process. That is to say, a white or black signal depending on the polarity of the pulse signal appears at a portion which may be lost in the reproduced signal, and thus it is possible to detect that the peak level of the modulating signal is higher than the maximum allowable input peak level $V_1$.

Figure 3:
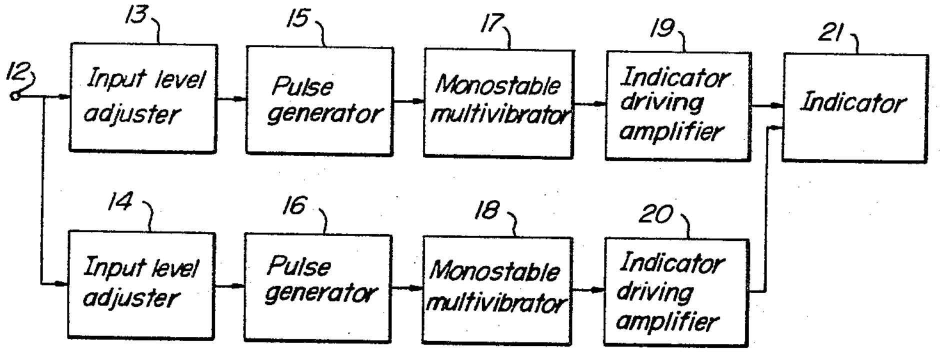
FIG. 3 is a block diagram showing another embodiment of the device according to the invention.

FIG. 3 shows another embodiment of the modulation indicating device according to the invention. This embodiment provides a two-stage modulation indicating means wherein a predetermined level lower than the maximum allowable level is first detected for indication, and subsequently the maximum allowable peak level is indicated by the aforesaid method. A positive video signal for frequency modulation is separated on the input side of a modulator and fed into the device from an input terminal 12. Then the positive video signal is supplied to each of two circuit systems, that is, a circuit system for indicating the maximum allowable peak level and a circuit system for indicating an intermediate level. These two circuit systems comprise input level adjusters 13 and 14, pulse generators 15 and 16 for generating a pulse at the maximum allowable peak level $V_1$ and the intermediate level $V_2$ in cooperation with said input level adjusters 13 and 14, monostable multivibrators 17 and 18 triggered by the pulses generated by said pulse generators 15 and 16, and indicator driving amplifiers 19 and 20 for amplifying the output of said multivibrators 17 and 18 to drive an indicator 21.

The modulation indicating device of FIG. 3 operates in the following manner. A portion of the video signal is fed from in input side of the modulator (not shown) into the input terminal 12. Then, as the level of said video signal is gradually made higher by the use of a modulation level adjuster (also not shown), the pulse generator 16 for intermediate level is actuated at first to generate a pulse at the intermediate level $V_2$ shown at *a* of FIG. 2. As a result of this pulse generation, the indicator 21 is actuated to indicate the intermediate level. Owing to the indication, it is possible to know an approximate value of the input level of the video signal supplied to the modulator. Then, when the input level is further increased until it reaches the maximum allowable level $V_1$ of FIG. 2, the pulse generator 15 for maximum allowable peak level is actuated to generate a pulse, which actuates the indicator 21 to indicate the maximum allowable peak level. It can therefore be known that the maximum allowable level is exceeded, and the input level may be lowered until the indication of the maximum allowable level disappears. The intermediate level $V_2$ may be set at a point, for example, 3 decibels lower than the maximum allowable peak level $V_1$.

Figure 4:
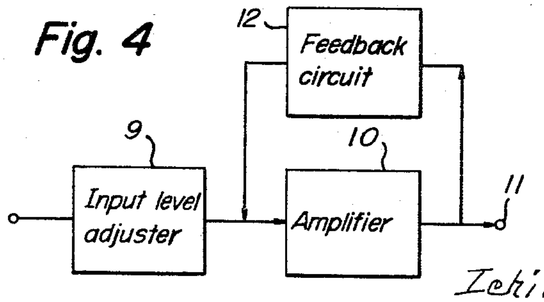
FIG. 4 is a block diagram of a pulse generator incorporated in the device of the invention.

One form of such pulse generator is illustrated in FIG. 4. In the pulse generator, the input signal is introduced through an input level adjuster 9 and amplified by an amplifier 10, thence fed to an output terminal 11. A portion of the output is fed back to the input side of the amplifier 10 by way of a feedback circuit 12.

It is well known that oscillation takes place when a portion or entirety of an output of a plurality of amplifiers is fed back to an input side, provided that the input has the same phase with the output and the gain of said amplifiers is greater than one.

Said pulse generator takes advantage of the oscillating action of a positive feedback amplifier. Or more precisely, by providing an inverse bias on an optional amplifying stage of said amplifier 10 and supplying, to the amplifying stage, an input of such an amount as will overcome the inverse bias and provide a gate effect. The condition for oscillation is satisfied through the amplifier 10 and the feedback circuit 12 to commence the oscillation. Thus, it is possible to control the oscillating action by suitably adjusting the level of the input into the amplifier 10. When a video signal is used as the input into the amplifying stage on which the inverse bias is provided, the video signal must have such a polarity that a white peak value thereof will overcome the inverse bias.

In the foregoing description, the inventive concept of the modulation indicating device of the invention has been disclosed. In the latter description, the device of the invention will be explained on a more materialized basis with reference to preferred embodiments.

Figures 5, 6, 7, 8, 9:
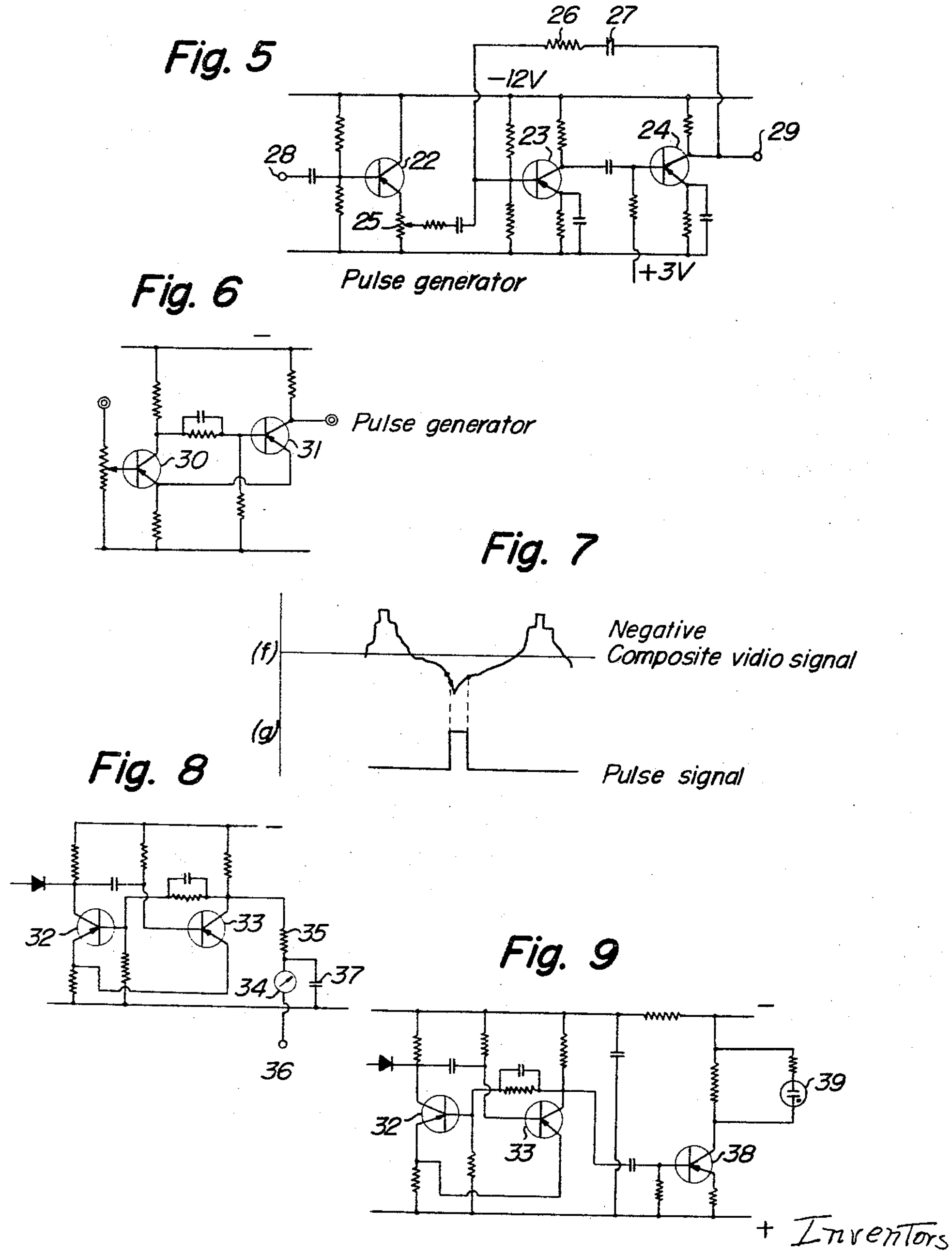
FIG. 5 is a circuit diagram of an embodiment of the pulse generator incorporated in the device of FIG. 3.
FIG. 6 is a circuit diagram of another embodiment of the pulse generator adapted to the device of the invention.
FIG. 7 is a view showing wave forms of signals in the circuit of FIG. 6.
FIG. 8 is a circuit diagram of one form of an indicator and a driving system therefor in the device of the invention.
FIG. 9 is a circuit diagram of another form of the indicator and the driving system therefor.

FIG. 5 shows an embodiment of a pulse generator which can be advantageously incorporated in the device of the invention. The pulse generator comprises PNP-type transistors 22, 23 and 24. The transistor 22 is of an emitter follower type and has an attenuator 25 on its emitter side. The transistor 23 is an amplifier having an amplification degree of about twenty times. The transistor 24 is an amplifier similar to the transistor 23 and an inverse bias of +3 volts is impressed on its base. Positive feed-back is made from the collector side of the transistor 24 through a resistance 26 and a condenser 27 to the base side of the transistor 23.

The pulse generator having the circuit arrangement of FIG. 5 operates in the following manner. When the positive composite video signal having a synchronizing signal on the negative side as shown at *a* of FIG. 2 is supplied to an input terminal 28, a signal having the same polarity and at an approximately same value with the input signal is obtained at the attenuator 25 disposed in the emitter circuit of the transistor 22. A portion of said signal is amplified and reversed in its polarity, and an output signal as shown at *c* of FIG. 2 is obtained on its collector side. The transistor 24 is actuated when the attenuator 25 is adjusted to increase the output of the transistor 23 up to a level which is just enough to overcome the inverse bias of 3 volts impressed on the transistor 24. Then, an oscillation circuit is formed by the circuits of the transistors 23 and 24, and a pulse-like output in the order of 10 volts can be obtained at a terminal 29 on the collector side of the transistor 24. In other words, when the video signal of the wave form as shown at *a* of FIG. 2 is impressed on the input terminal 28, the video signal of the wave form as shown at *c* of FIG. 2 is impressed on the base of the transistor 24, and the pulse output as shown at *b* of FIG. 2 is obtained adjacent the peak level of said video signal.

All of the foregoing descriptions have dealt with the detection of a peak level by the variation of magnitude of a mean level of the signal instead of clamping it at a certain level, but, strictly speaking, a clamped circuit arrangement is preferable.

As commonly known, the peak level of the video signal may be discussed with regard to a cycle of a horizontal synchronizing signal in the order of 60 μsec., and FIG. 2 shows the variation of the video information within that range. The pulse wave shown at *b* of FIG. 2 has a width of 2 to 4 μsec.

FIG. 6 shows another embodiment of the pulse generator, and this embodiment comprises a Schmidt circuit including therein PNP-type transistors 30 and 31. According to this pulse generator, a pulse as shown at *g* of FIG. 7 will be obtained at the collector side of the transistor 31 when a composite input video signal having a synchronous signal on its positive side as shown at *f* of FIG. 7 is supplied to the base of the transistor 30. In this case, hysteresis may be developed in the operation of the Schmidt circuit, but this pulse generator will equally effectively operate as a pulse generating means in the manner in which the aforesaid generator operates.

FIG. 8 illustrates one form of an indicator and a driving system therefor adapted to the device of the invention, and an ammeter is utilized to serve as the indicator. In this embodiment, PNP-type transistors 32 and 33 constitute a mono-stable multivibrator. Said pulse signal is supplied to the collector side of the transistor 32 in the form of a trigger input, and a square wave is generated on the collector side of the transistor 33. If no trigger input is supplied to the transistor 32, the transistor 33 is "on" at all times and a current flows in the collector of the transistor 33, with the potential of the collector close to that of the emitter. An ammeter 34 having a high sensitivity and an excellent transient response is connected through a resistance 35 between the collector of the transistor 33 and a negative source 36. This negative source

36 has a negative potential which is equal to the collector voltage of the transistor 33 when no trigger input is impressed on the transistor 32. Without any introduction of such trigger input therefore, the pointer of the ammeter 34 would not move in any direction. When, on the contrary, such trigger input is supplied, a square wave output is obtained at the collector side of the transisor 33. The mean potential of such output is lower than the potential when no trigger input is applied to the transistor 32. Therefore, a mean current flows in the ammeter 34 to move the pointer thereof due to the integral action of the time-constant circuit including the resistance 35 and a capacitor 37.

In FIG. 9, a glow lamp 39 is used in place of the ammeter 34 of FIG. 8. In this case, the output of the monostable multivibrator circuit comprising the transistors 32 and 33 is amplified by a transistor 38 to energize the glow lamp 39 connected to the collector of the transistor 38. It will readily be understood that the circuit of FIG. 9 operates in the manner similar to that of FIG. 8.

Although, in the foregoing description, the invention has been explained with reference to the specific embodiments, it will be understood that the invention is in no way limited to such embodiments and various modifications and changes may be made without departing from the spirit and scope of the invention.

What is claimed is:

1. A modulation indicating device comprising pulse generator means having at least one amplifying stage and a positive feedback path across said amplifying stage, at least said amplifying stage being so biased that said pulse generator means may generate an output pulse only when a peak voltage of an input in the form of a modulating television signal to said pulse generator means exceeds a predetermined allowable modulation level, and indicating means operative in response to the output pulse of said pulse generator means.

2. A modulation indicating device comprising pulse generator means having at least one amplifying stage and a positive feedback path across said amplifying stage, at least said amplifying stage being so biased that said pulse generator means may generate an output pulse only when a peak voltage of an input in the form of a modulating television signal to said pulse generator means exceeds a predetermined allowable modulation level, means for superposing the output pulses on the demodulated signal obtained by demodulating a signal modulated with said modulating signal, and means for indicating said demodulated signal with pulses superposed thereon at a television receiver tube.

3. A modulation indicating means comprising pulse generator means having at least one amplifying stage and a positive feedback path across said amplifying stage, at least said amplifying stage being so biased that said pulse generator means may generate an output pulse only when a peak voltage of an input in the form of a modulating television signal to said pulse generator means exceeds a predetermined allowable modulation level, means for decreasing the repetition frequency of said output pulse to produce a squarewave, and indicating means operative in response to said squarewave.

References Cited

UNITED STATES PATENTS

| | | | |
|---|---|---|---|
| 2,575,358 | 11/1951 | Nuckolls | 179—1 |
| 3,184,537 | 5/1965 | Court | 178—69.5 |

JOHN W. CALDWELL, *Acting Primary Examiner.*

H. W. BRITTON, *Assistant Examiner.*